United States Patent
Hatanaka et al.

(10) Patent No.: US 9,851,211 B2
(45) Date of Patent: Dec. 26, 2017

(54) INFORMATION PROCESSING APPARATUS, COMPUTER-READABLE RECORDING MEDIUM, AND INFORMATION PROCESSING SYSTEM

(71) Applicants: Wataru Hatanaka, Kanagawa (JP); Daiki Inaba, Tokyo (JP); Hiroshi Shimura, Kanagawa (JP)

(72) Inventors: Wataru Hatanaka, Kanagawa (JP); Daiki Inaba, Tokyo (JP); Hiroshi Shimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/175,402

(22) Filed: Jun. 7, 2016

(65) Prior Publication Data

US 2016/0363454 A1     Dec. 15, 2016

(30) Foreign Application Priority Data

Jun. 12, 2015 (JP) ................................ 2015-119493

(51) Int. Cl.
  *G01C 21/34* (2006.01)
  *G05D 1/02* (2006.01)
(52) U.S. Cl.
  CPC ........... *G01C 21/34* (2013.01); *G05D 1/0217* (2013.01); *G05D 2201/0209* (2013.01)
(58) Field of Classification Search
  CPC .................. G01C 21/34; G05D 1/0217; G05D 2201/0209
  See application file for complete search history.

(56) References Cited

U.S. PATENT DOCUMENTS

| | | | |
|---|---|---|---|
| 8,515,612 B2* | 8/2013 | Tanaka | G05D 1/0274 700/245 |
| 2003/0045997 A1* | 3/2003 | Nakane | G01C 21/32 701/431 |
| 2008/0255756 A1* | 10/2008 | Friedrichs | G01C 21/3446 701/533 |

(Continued)

FOREIGN PATENT DOCUMENTS

| | | |
|---|---|---|
| JP | 06-124118 | 5/1994 |
| JP | 5083543 | 9/2012 |

(Continued)

*Primary Examiner* — Rodney Butler
(74) *Attorney, Agent, or Firm* — Oblon, McClelland, Maier & Neustadt, L.L.P.

(57) ABSTRACT

An information processing apparatus includes: a travel purpose acquisition unit that acquires a travel purpose of a mobile object; a setting unit that sets multiple travel routes in different travel directions in a forward area with respect to the mobile object; a calculation unit that calculates, regarding each of the multiple travel routes, a predictive value of a travel state in which the mobile object travels along each of the multiple travel routes; a computing unit that computes, regarding each of the multiple travel routes, an evaluation value for the mobile object to realize traveling according to the travel purpose from weighting values that are predetermined according to the travel purpose and the predictive values; and a determining unit that determines, as a travel route to be followed next, a travel route with the highest evaluation represented by the evaluation value among the multiple travel routes.

20 Claims, 12 Drawing Sheets

(56) References Cited

U.S. PATENT DOCUMENTS

| | | | | |
|---|---|---|---|---|
| 2015/0198449 A1* | 7/2015 | Okude | ............... | G01C 21/3492 |
| | | | | 701/408 |
| 2015/0253142 A1* | 9/2015 | Kornhauser | ....... | G01C 21/3415 |
| | | | | 701/522 |
| 2016/0349751 A1* | 12/2016 | Sugimoto | .............. | G01C 21/36 |

FOREIGN PATENT DOCUMENTS

| | | |
|---|---|---|
| JP | 5192868 | 2/2013 |
| JP | 2014-228941 | 12/2014 |

* cited by examiner

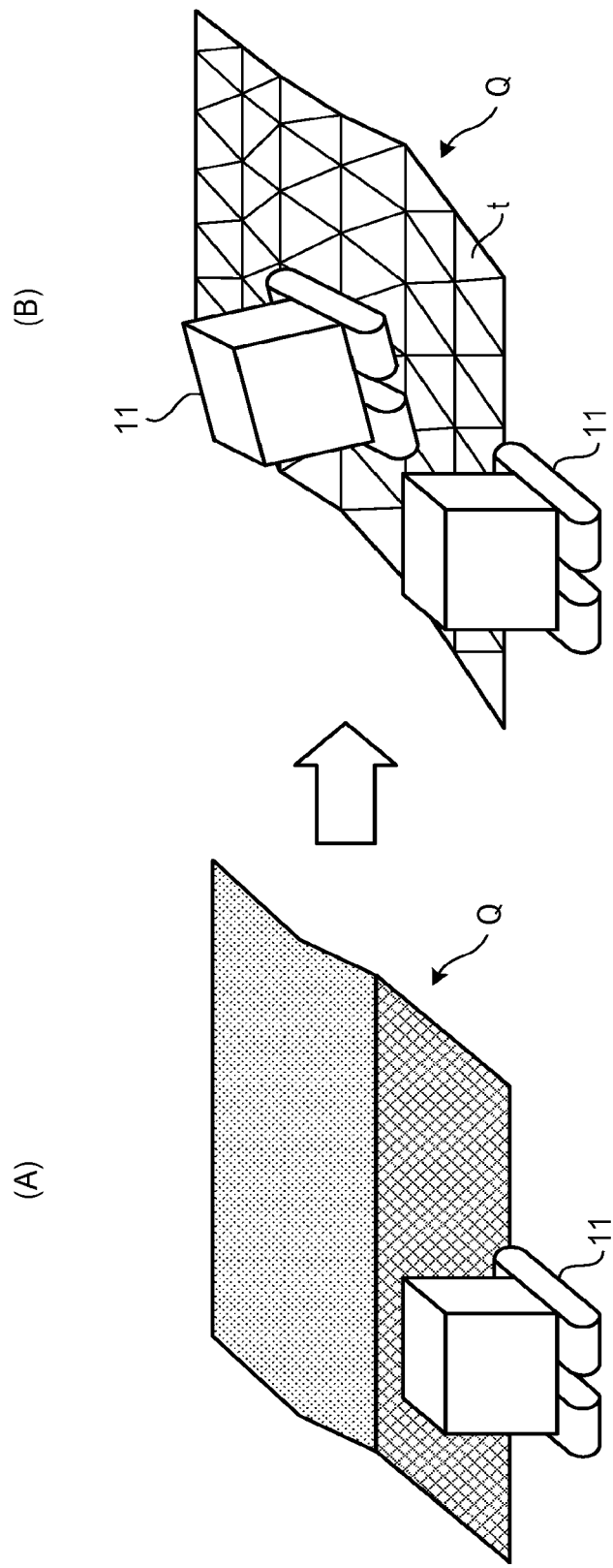

FIG.7

| TRAVEL PURPOSE | CHARACTERISTIC | WEIGHTING VALUE | | |
|---|---|---|---|---|
| | | ATTITUDE | DEGREE OF SWING | SINKING |
| CARGO TRANSFER (SPEED IS PRIORITIZED) | ·MOVE QUICKLY | 4 | 3 | 3 |
| CARGO TRANSFER (ACCURACY IS PRIORITIZED) | ·NOT TO DAMAGE CARGO | 2 | 5 | 3 |
| CHEMICAL APPLICATION | ·APPLY UNIFORMLY | 4 | 3 | 3 |
| ENCLOSURE MANAGEMENT | ·MONITOR ALL OVER ENCLOSURE ·CAPTURE FINE IMAGES | 3 | 5 | 2 |
| WORK ASSIST | ·FOLLOW PERSON ·DO NOT FALL OVER | 4 | 2 | 4 |
| DANGEROUS AREA SURVEY | ·DO NOT FALL OVER ·GROUND COLLAPSES EASILY | 4 | 1 | 5 |
| PLANET SEARCH | ·DO NOT FALL OVER ·GO FORWARD SLOWLY AND ASSUREDLY | 2 | 3 | 5 |
| COMMERCIAL COMPLEX GUIDE | ·MOVE QUICKLY ·MOVE INDOORS | 8 | 1 | 1 |
| RESCUE | ·MOVE QUICKLY ·DO NOT FALL OVER | 4 | 4 | 2 |

FIG.8

| TRAVEL PURPOSE | CHARACTERISTIC | WEIGHTING VALUE | | | | |
| --- | --- | --- | --- | --- | --- | --- |
| | | a1 | a2 | a3 | | an |
| CARGO TRANSFER (SPEED IS PRIORITIZED) | ·MOVE QUICKLY | 2 | 1.5 | 1.5 | | |
| CARGO TRANSFER (ACCURACY IS PRIORITIZED) | ·NOT TO DAMAGE CARGO | 1 | 2.5 | 1.5 | | |
| CHEMICAL APPLICATION | ·APPLY UNIFORMLY | 2 | 1.5 | 1.5 | | |
| ENCLOSURE MANAGEMENT | ·MONITOR ALL OVER ENCLOSURE ·CAPTURE FINE IMAGES | 1.5 | 2.5 | 1 | | |
| WORK ASSIST | ·FOLLOW PERSON ·DO NOT FALL OVER | 2 | 1 | 2 | | |
| DANGEROUS AREA SURVEY | ·DO NOT FALL OVER ·GROUND COLLAPSES EASILY | 2 | 0.5 | 2.5 | | |
| PLANET SEARCH | ·DO NOT FALL OVER ·GO FORWARD SLOWLY AND ASSUREDLY | 1 | 1.5 | 2.5 | | |
| COMMERCIAL COMPLEX GUIDE | ·MOVE QUICKLY ·MOVE INDOORS | 4 | 0.5 | 0.5 | | |
| RESCUE | ·MOVE QUICKLY ·DO NOT FALL OVER | 2 | 2 | 1 | | |

52

INFORMATION PROCESSING APPARATUS, COMPUTER-READABLE RECORDING MEDIUM, AND INFORMATION PROCESSING SYSTEM

CROSS-REFERENCE TO RELATED APPLICATION

The present application claims priority under 35 U.S.C. §119 to Japanese Patent Application No. 2015-119493 filed in Japan on Jun. 12, 2015. The contents of which are incorporated herein by reference in their entirety.

BACKGROUND OF THE INVENTION

1. Field of the Invention

The present invention relates generally to an information processing apparatus, a computer-readable recording medium, and an information processing system.

2. Description of the Related Art

Mobile objects that autonomously travel are known. As a technology of causing a mobile object to travel autonomously, a technology of sensing a forward area with respect to a mobile object and causing the mobile object to travel an area that is determined as a travelable area is disclosed.

For example, a technology of, using profile data obtained with a laser range finder that senses a forward area with respect to a mobile object, dividing the forward area into a travelable area and a non-travelable area is disclosed. Furthermore, a technology is disclosed in which physical quantities, such as the slope or the degree of unevenness of a travelable area or a non-travelable area, are obtained accurately by using Markov chain Monte Carlo methods to stably determine a travelable area (see, for example, Japanese Patent No. 5192868).

A mobile object may be required to autonomously travel for a travel purpose. In this case, it is required to cause autonomous traveling while realizing traveling according to the travel purpose; however, conventionally, it is difficult to determine a travel route allowing autonomous walking according to the travel purpose.

SUMMARY OF THE INVENTION

It is an object of the present invention to at least partially solve the problems in the conventional technology.

According to exemplary embodiments of the present invention, there is provided an information processing apparatus comprising: a travel purpose acquisition unit that acquires a travel purpose of a mobile object; a setting unit that sets multiple travel routes in different travel directions in a forward area with respect to the mobile object; a calculation unit that calculates, regarding each of the multiple travel routes, a predictive value of a travel state in which the mobile object travels along each of the multiple travel routes; a computing unit that computes, regarding each of the multiple travel routes, an evaluation value for the mobile object to realize traveling according to the travel purpose from weighting values that are predetermined according to the travel purpose and the predictive values; and a determining unit that determines, as a travel route to be followed next, a travel route with the highest evaluation represented by the evaluation value among the multiple travel routes.

Exemplary embodiments of the present invention also provide a non-transitory computer-readable recording medium that contains an information processing program for causing a computer to execute a method comprising: acquiring a travel purpose of a mobile object; setting multiple travel routes in different travel directions in a forward area with respect to the mobile object; calculating, regarding each of the multiple travel routes, a predictive value of a travel state in which the mobile object travels along each of the multiple travel routes; computing, regarding each of the multiple travel routes, an evaluation value for the mobile object to realize traveling according to the travel purpose from weighting values that are predetermined according to the travel purpose and the predictive values; and determining, as a travel route to be followed next, a travel route with the highest evaluation represented by the evaluation value among the multiple travel routes.

Exemplary embodiments of the present invention also provide an information processing system comprising: an information processing apparatus; a sensor connected to the information processing apparatus; and a drive unit that is connected to the information processing apparatus and drives a mobile mechanism that causes a mobile object to travel, wherein the information processing apparatus comprises: a travel purpose acquisition unit that acquires a travel purpose of the mobile object; a setting unit that sets multiple travel routes in different travel directions in a forward area with respect to the mobile object; a calculation unit that calculates, regarding each of the multiple travel routes, a predictive value of a travel state in which the mobile object travels along each of the multiple travel routes; a computing unit that computes, regarding each of the multiple travel routes, an evaluation value for the mobile object to realize traveling according to the travel purpose from weighting values that are predetermined according to the travel purpose and the predictive values; a determining unit that determines, as a travel route to be followed next, a travel route with the highest evaluation represented by the evaluation value among the multiple travel routes; and a drive control unit that controls the drive unit to enable traveling along the determined travel route.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating calculation of predicted values using physical simulation;

FIG. 7 is a table of an exemplary data structure of first information;

FIG. 8 is a table of an exemplary data structure of the first information;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
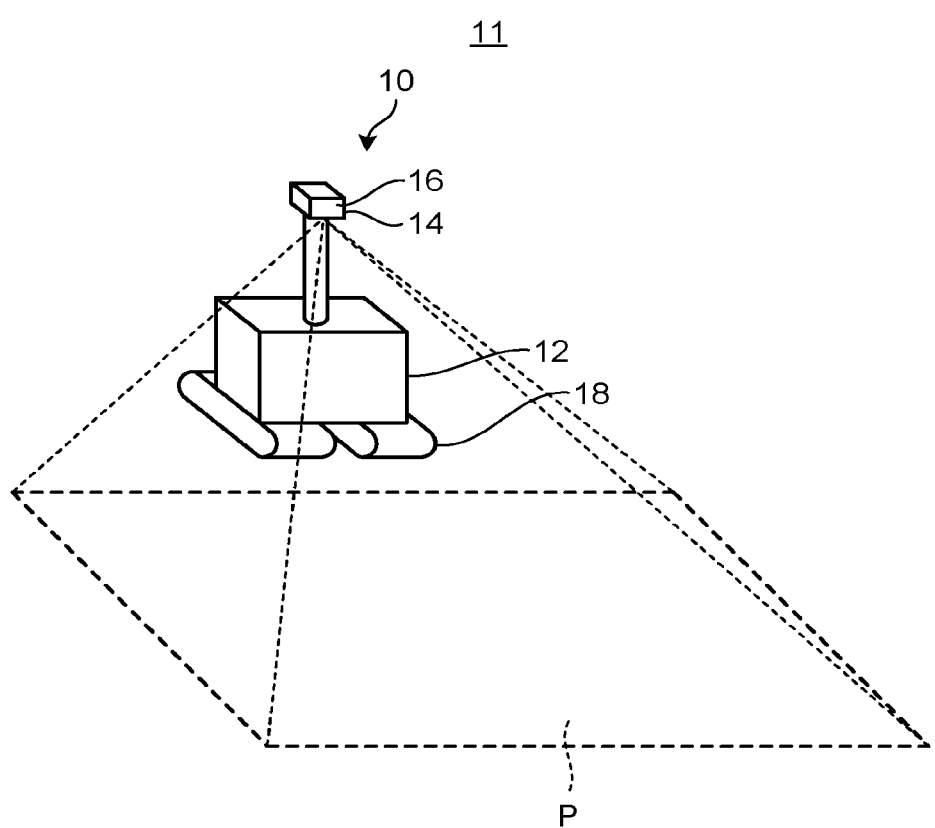
FIG. 1 is a schematic diagram of the exterior of a mobile object of an embodiment of the invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An information processing apparatus, a computer-readable recording medium, and an information processing system according to an embodiment of the invention will be described below with reference to the drawings.

The mode of the embodiment where an information processing system is mounted on a mobile object that autonomously travels will be described as an example. The information processing system may be configured to be independent of the main unit of the mobile object.

FIG. 1 is a schematic diagram of the exterior of a mobile object 11 according to the embodiment. The case of the embodiment where the mobile object 11 is a vehicle will be described as an example.

According to the embodiment, an information processing system 10 is mounted on the mobile object 11. The information processing system 10 includes a sensor 16, a sensor 14, an information processing apparatus 12, and a mobile mechanism 18.

The mobile mechanism 18 is a mechanism for moving the main unit of the mobile object 11 to move to a forward area P. The forward area P is an area on the ground (or a road surface) in the direction followed by the mobile mechanism 18. It suffices if the mobile mechanism 18 is a function of causing the main unit of the mobile object 11 to move. The mobile mechanism 18 is, for example, tires or caterpillars. When the mobile object 11 is, for example, a robot modeling a living thing, the mobile mechanism 18 may be robot arms modeling the legs of a living thing.

The sensor 14 detects mobile object information representing the current state of the main unit of the mobile object 11. The mobile object information contains, for example, the moving speed and the acceleration of the mobile object 11, the distance of move, the current position of the mobile object 11 represented by the latitude, longitude and altitude, and the current attitude of the mobile object 11 (slope (roll and pitch) and direction (yawing)). The mobile object information may contain the specification of the mobile object 11 (size, weight, the position of the center of gravity, the maximum speed, the maximum acceleration and deceleration, and the maximum rotational speed). The specification of the mobile object 11 may be stored in advance in a storage unit 22. The sensor 14 includes, for example, an acceleration sensor, a gyro sensor, a rotary encoder, and a global positioning system (GPS).

The sensor 16 detects geographic information representing the three-dimensional geography around the mobile object 11. The sensor 16 is arranged in a position where it is possible to detect the geographic information on the forward area P with respect to the mobile object 11. The sensor 16 is, for example, a stereo camera, a laser range finder, or a supersonic sensor.

When the sensor 16 is a laser range finder or a supersonic sensor, information to be obtained is two-dimensional information. For this reason, when the sensor 16 is a laser finder or a supersonic sensor, it suffices if the sensor 16 is configured to further include an actuator for periodically driving the sensor 16 vertically (the direction orthogonal to the horizontal direction), which allows the sensor 16 to detect geographic information representing a three-dimensional geography.

The information processing apparatus 12 controls the information processing system 10 to cause the mobile object to travel autonomously as will be described in detail below.

Figure 2:
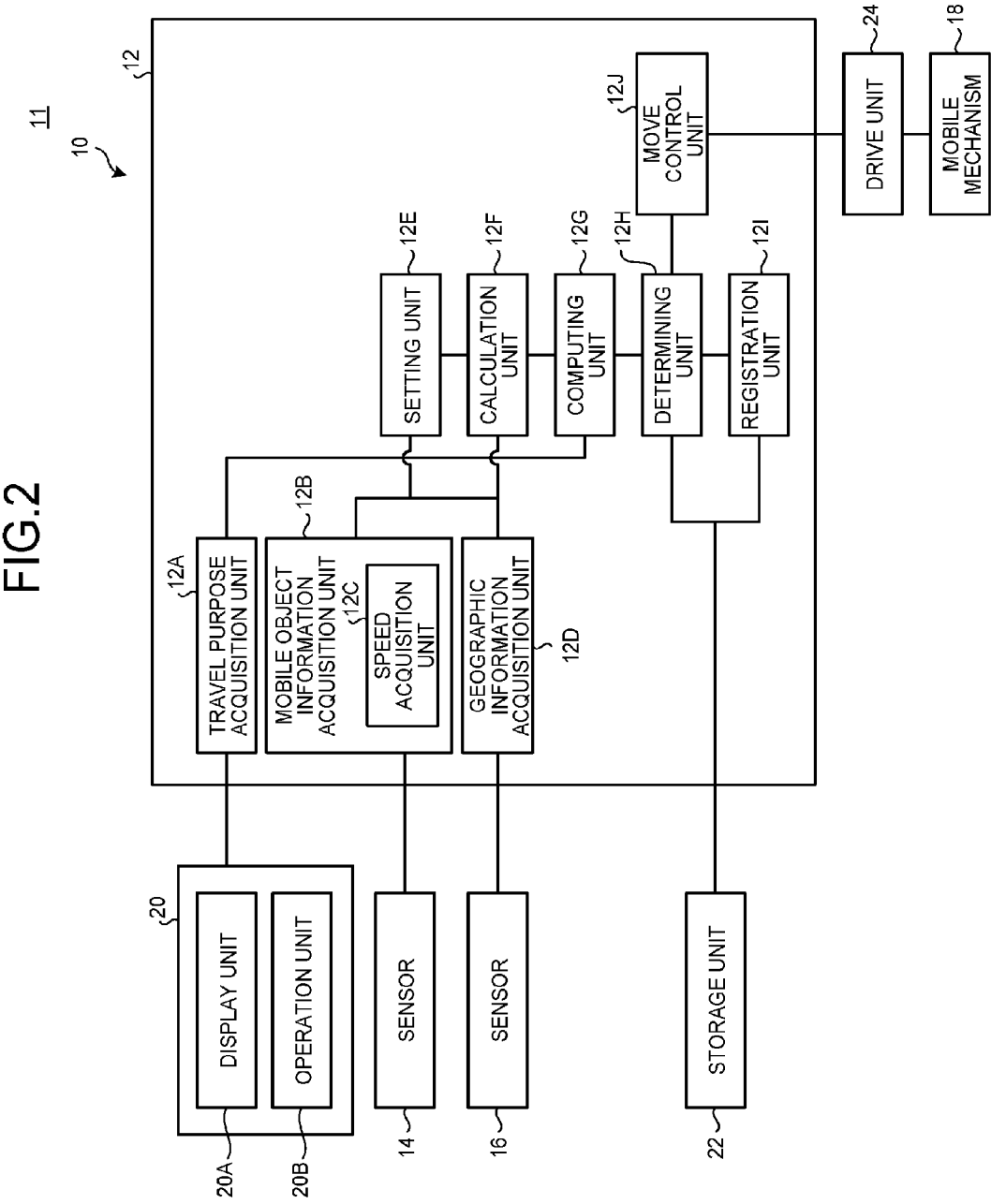
FIG. 2 is a functional block diagram of a mobile object.

FIG. 2 is a functional block diagram of the mobile object 11 on which the information processing system 10 is mounted. The information processing system 10 includes a user interface (UI) unit 20, the sensor 14, the sensor 16, the storage unit 22, a drive unit 24, the mobile mechanism 18, and the information processing apparatus 12. The UI unit 20, the sensor 14, the sensor 16, the storage unit 22, the drive unit 24, and the information processing apparatus 12 are connected so as to communicate signals. The drive unit 24 and the mobile mechanism 18 are connected so as to communicate signals.

The UI unit 20 accepts an operational input made by the user and displays various types of information. The UI unit 20 includes a display unit 20A and an operation unit 20B.

The display unit 20A displays various types of information. The display unit 20A is a known display device, such as a liquid crystal display (LCD). The information processing system 10 is not necessarily configured to include the display unit 20A.

The operation unit 20B accepts various operations from the user. The operation unit 20B is, for example, buttons, a remote controller, speech recognition with a microphone, and a keyboard.

The storage unit 22 stores various types of data.

The drive unit 24 drives the mobile mechanism 18. The drive unit 24 has, for example, a configuration of a combination of one or more motors and gears. The drive unit 24 drives the mobile mechanism 18 according to the control of the information processing apparatus 12. The mobile mechanism 18 is driven in the direction corresponding to the drive force transmitted from the drive unit 24 at the speed corresponding to the drive force. Driving the mobile mechanism 18 causes the mobile object 11 to travel.

The information processing apparatus 12 controls the information processing system 10. According to the embodiment, the information processing apparatus 12 controls autonomous traveling of the mobile object 11.

The information processing apparatus 12 is implemented with, for example, a CPU, a ROM and a RAM. The information processing apparatus 12 may be implemented with, for example, a circuit other than CPU.

The information processing apparatus 12 includes a travel purpose acquisition unit 12A, a mobile object information acquisition unit 12B, a geographic information acquisition unit 12D, a setting unit 12E, a calculation unit 12F, a computing unit 12G, a determining unit 12H, a registration unit 12I, and a move control unit 12J. Part or all of the travel purpose acquisition unit 12A, the mobile object information acquisition unit 12B, the geographic information acquisition unit 12D, the setting unit 12E, the calculation unit 12F, the computing unit 12G, the determining unit 12H, the registration unit 12I, and the move control unit 12J may be implemented by causing a processing device, such as a CPU, to execute a program (i.e., with software), may be implemented with hardware, such as an integrated circuit (IC), or may be implemented with both the program and hardware.

The user may require the mobile object 11 to travel autonomously according to the travel purpose. In other words, the route where travel for satisfying the travel purpose can be implemented may vary according to the travel purpose.

According to the embodiment, the travel purpose acquisition unit 12A acquires the travel purpose of the mobile object 1. The travel purpose is the purpose of causing the mobile object 11 to travel autonomously. The travel purpose is, for example, cargo transfer (speed is prioritized), cargo transfer (accuracy is prioritized), chemical application, enclosure management, work assist, survey of a dangerous area, planet search, guide, or rescue.

According to the embodiment, the travel purpose acquisition unit 12A acquires the travel purpose from the UI unit 20. The user operates the UI unit 20 to input a travel purpose of the mobile object 11. The travel purpose acquisition unit 12A acquires the travel purpose from the UI unit 20. The storage unit 22 may store the travel purpose in advance. In this case, the travel purpose acquisition unit 12A may acquire the travel purpose by reading the travel purpose from the storage unit 22. The travel purpose acquisition unit 12A may acquire the travel purpose from an external device via, for example, a communication line.

Using the result of detection performed by the sensor 14, the mobile object information acquisition unit 12B acquires mobile object information. In other words, the mobile object information acquisition unit 12B acquires, from the sensor 14, mobile object information, such as the moving speed and the acceleration of the mobile object 11, the distance of move, the current position of the mobile object 11 represented by the latitude, longitude and altitude, the current attitude of the mobile object 11 (slope (roll and pitch) and direction (yawing)), and the specification of the mobile object 11 (size, weight, the position of the center of gravity, the maximum speed, the maximum acceleration and deceleration, and the maximum rotational speed). The mobile object information acquisition unit 12B may acquire the specification of the mobile object 11 by reading it from the storage unit 22.

The mobile object information acquisition unit 12B may calculate mobile object information by using the result of detection performed by the sensor 14.

For example, to calculate the current position of the mobile object 11, a method of acquiring odometry from the rotary encoder mounted on the sensor 14 or a method of calculating the current position according to a known method by using the GPS information acquired from the GPS mounted on the sensor 14.

The mobile object information acquisition unit 12B includes a speed acquisition unit 12C. The speed acquisition unit 12C acquires speed information representing the current moving speed of the mobile object 11. It suffices if the speed acquisition unit 12C acquires the speed information by calculating speed information from the result of detection performed by the sensor 14.

The geographic information acquisition unit 12D acquires geographic information representing the geography of the forward area P. The geographic information acquisition unit 12D acquires geographic information from the sensor 16. The mode of the embodiment will be described where the geographic information acquisition unit 12D generates a geographic image in which three-dimensional coordinates of latitude, longitude and altitude are determined for each pixel from the geographic information of the forward area P acquired from the sensor 16.

When the sensor 16 is a stereo camera, the geographic information acquisition unit 12D may generate a geographic image by matching the right and left images. When the sensor 16 is a laser range finder or a supersonic sensor, it suffices if the geographic information acquisition unit 12D generates a geographic image by synthesizing the two-dimensional information that is the result of detection performed by the sensor 16 according to the angle of oscillation of the actuator.

The setting unit 12E sets multiple travel routes in different travel directions in the forward area P with respect to the mobile object 11. Depending on the structure of the mobile mechanism 18, there is a direction in which the mobile object 11 is not mobile.

For example, when the mobile object 11 is a nonholonomic system, it is difficult for the mobile mechanism 18 to directly move in the direction along the axle of tire. For this reason, the setting unit 12E preferably sets multiple travel routes representing routes following the multiple directions in which the mobile object 11 is mobile.

In other words, in consideration of the restriction conditions on the move of the mobile object 11, the setting unit 12E sets multiple travel routes A. As the method for the setting unit 12E to set a travel route A, for example, there is a setting method using the moving speed, acceleration, and resolution of the mobile object 11. For example, it suffices if the setting unit 12E sets a travel route A by using the method according to "Fox, Dieter, Wolfram Burgard, and Sebastian Thrun. The dynamic window approach to collision avoidance. IEEE Robotics & Automation Magazine 4.1 (1997): 23-33".

As described above, the setting unit 12E sets a travel route in a travel direction in which the mobile object 11 is mobile, which prevents the mobile object 11 from entering an unexpected state in which the mobile object 11 is not mobile while traveling.

Figure 3A:
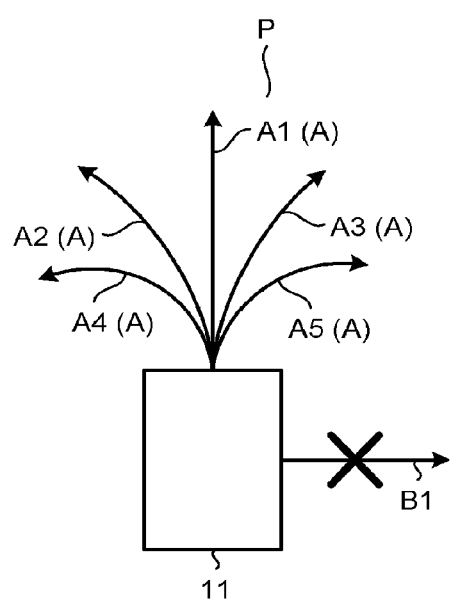
FIGS. 3A and 3B are diagrams illustrating determination of a travel route.
Figure 3B:
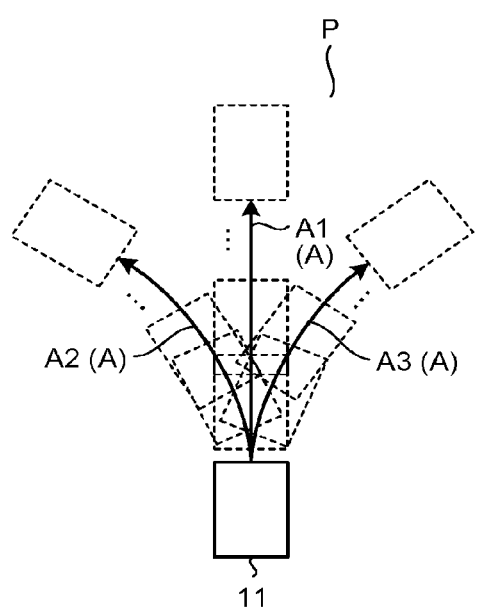

FIGS. 3A and 3B are diagrams illustrating determination of a travel route A made by the setting unit 12E. As shown in FIG. 3A, for example, while the mobile object 11 is mobile in the directions of the travel routes A1 to A5, it is difficult for the mobile object 11 to directly move in the direction B1 because of the structure of the mobile mechanism 18 of the mobile object 11. In this case, it suffices if the setting unit 12E sets some multiple travel routes among the travel routes A1 to A5 in which the mobile object 11 is mobile. For example, as shown in FIG. 3B, the setting unit 12E sets the travel route A1, the travel route A2, and the travel route A3.

Note that it suffices if multiple travel routes A are set by the setting unit 12E, i.e., the number of travel routes A is not limited to three.

FIG. 2 will be referred back here. Regarding each of the multiple travel routes that are set by the setting unit 12E, the calculation unit 12F calculates a predictive value of the travel state in which the mobile object 11 travels along each of the multiple travel routes A.

The travel state represents the state of the mobile object 11 during traveling. The travel state is, for example, determined by multiple variable factors that vary according to the travel of the mobile object 11. The variable factors include, for example, at least one of the attitude of the mobile object 11, the degree of swing of the mobile object 11, sinking of the mobile object 11, and the color of the ground of the forward area P. The variable factors may further include other variable factors and are not limited to the above-listed factors.

The calculation unit 12F calculates a predictive value of the travel state by using the geographic information on the forward area P. According to the embodiment, the calculation unit 12F calculates a predictive value by using the geographic image acquired by the geographic information acquisition unit 12D and the multiple travel routes A that are set by the setting unit 12E. The calculation unit 12F preferably calculates a predictive value for each of the multiple variable factors that determine the travel state.

Figure 4A:
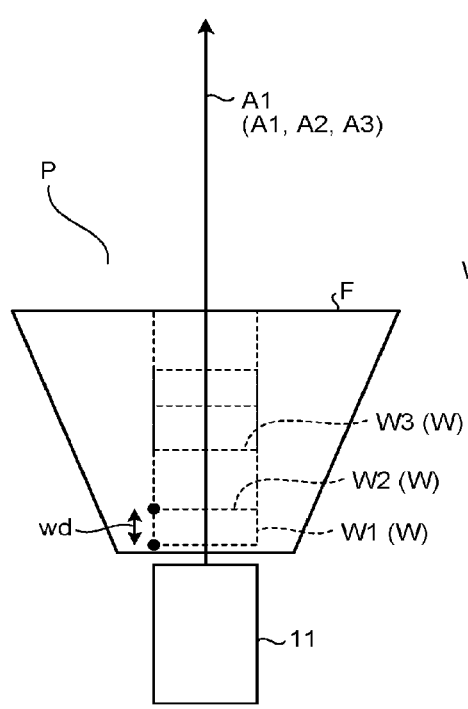
FIGS. 4A and 4B are diagrams illustrating calculation of a predictive value.
Figure 4B:
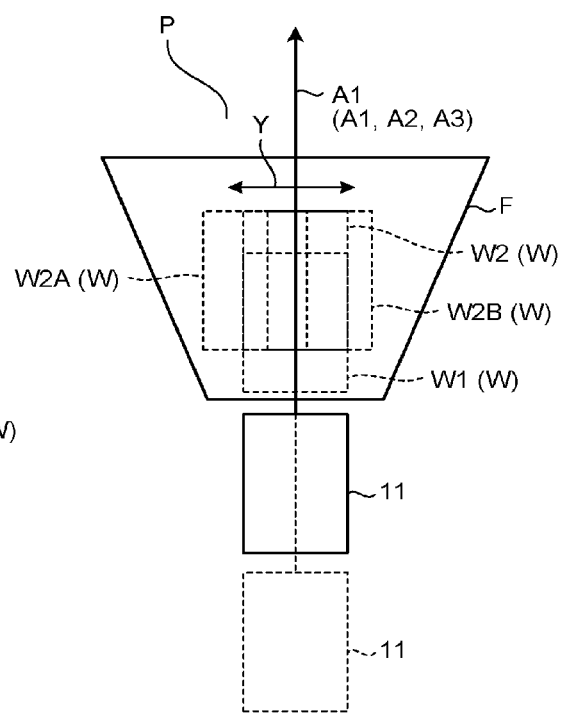

FIGS. 4A and 4B are diagrams illustrating calculation of predictive values. The calculation unit 12F reads the multiple travel routes A that are set by the setting unit 12E. The setting unit 12E according to the embodiment will be described as a unit that sets three travel routes A that are the travel routes A1 to A3. Accordingly, the calculation unit 12F reads the three travel routes A that are the travel routes A1 to A3.

The calculation unit 12F performs the following process on each of the travel routes A (the travel routes A1 to A3) that are set.

Specifically, the calculation unit 12F arranges the set travel routes A on their corresponding positions on the geographic image. It suffices if, using the mobile object information acquired by the mobile object information acquisition unit 12B and the travel routes A that are set by the setting unit 12E, the calculation unit 12F arranges the set travel routes A on their corresponding positions on the geographic image according to a known method.

The calculation unit 12F sets a search area F on the travel route A arranged on the geographic image. FIG. 4A exemplifies a state where a search area F is set on the travel route A1. The search area F is an area having the shape of a trapezoid in the forward area P with respect to the object 11 and the shorter side of the two parallel sides of the trapezoid area is set to be closer to the mobile object 11. It suffices if the length of the search area F along the travel route A1 (corresponding to the interval between the two parallel sides of the trapezoid area) exceeds the length of the mobile object 11 in the direction along the travel route A1.

FIGS. 4A and 4B show the case where the length of the search area F in the direction along the travel route A1 is 1.5 times the length of the mobile object in the direction along the travel route A1; however, the length is not limited to this.

The calculation unit 12F arranges a window W in an initial position that is the position closest to the mobile object 11 along the travel route A1 in the search area F on the geographic image (see window W1). It suffices if the window W has a size and a shape equivalent to those of the mobile object 11.

The calculation unit 12F calculates predictive values regarding the window W1 on the geographic image. Here, regarding the window W1, the calculation unit 12F preferably calculates a predictive value for each of the multiple variable factors that determine the travel state. For example, regarding the widow W1, the calculation unit 12F calculates a predictive value of the attitude of the mobile object 11, a predictive value of the degree of swing of the mobile object 11, and a predictive value of sinking of the mobile object 11.

Each time the calculation unit 12F calculates predictive values, the calculation unit 12F moves, by a pre-determined working distance wd, the window W along the travel route A in the direction in which the window W moves away from the mobile object 11. Then moving the window W and calculating predictive values are repeated until the end of the window W opposite to the mobile object 11 reaches the position of the end of the search area F opposite to the mobile object 11 (see Windows W1 to W3).

On the basis of the predictive values, the information processing apparatus 12 determines a travel route A (for example, the travel route A1) to be followed next by, for example, computing evaluation values to be described below (details will be described below). The information processing apparatus 12 repeats calculating predictive values regarding each window W in the search area F after moving the mobile object 11 by the search area F along the determined travel route A (for example, the travel route A1) (see FIG. 4B).

As described above, it suffices if the window W has a size and a shape equivalent to those of the mobile object 11; however, if the search area F is a soft ground or a road surface with a lot of unevenness, the mobile object 11 may travel while more or less sliding off the predicted travel route A. For this reason, the widow W may be moved also in the direction Y intersecting with the travel route A within the search area F (see FIG. 4(B), the window W2A, and the window W2B).

In this case, it suffices if, each time the calculation unit 12F calculates predictive values regarding the window W, the calculation unit 12F repeatedly executes a moving process of moving, by the predetermined working distance wd, the window W in the direction in which the window W moves away from the moving object 11 along the travel route A and the moving process of causing the window W to reciprocate in the direction Y that intersects with the travel route A.

As described above, the calculation unit 12F calculates predictive values for each of the travel routes A that are set by the setting unit 12E. For this reason, according to the embodiment, the process of calculating predictive values is not performed for a route without possibility that the mobile object 11 will travel, which shortens the process time and simplifies the process.

In this manner, the calculation unit 12F calculates predictive values representing the travel state of the mobile object 11 traveling the travel route A that is set. According to the embodiment, the worse the travel state is, the larger the predictive value calculated by the calculation unit 12F is. Furthermore, the better the travel state is, the smaller the predictive value calculated by the calculation unit 12F is.

A worse travel state represents that the values of the above-described variable factors that vary according to the travel of the mobile object 11 are larger. Specifically, the worse travel state represents that the attitude of the mobile object 11, the degree of swing of the mobile object 11, sinking of the mobile object 11, and the color of the ground are different from those of the most preferable travel state for the travel of the mobile object 11.

For example, the more the attitude of the mobile object 11 on the travel route A is different from a standard attitude, the worse the travel state represented by the predictive values calculated by the calculation unit 12F is (the larger the predicted values are, according to the embodiment). Furthermore, the greater the swing of the mobile object 11 in the attitude in the travel route A is compared to that in a standard state without any variation in swing, the worse the travel state represented by the predictive values calculated by the calculation unit 12F is (the larger the predicted values are, according to the embodiment).

Furthermore, for example, the greater the sinking of the mobile object 11 in the travel route A during travel is compare to that in a standard state without sinking, the worse the travel state represented by the predicted values calculated by the calculation unit 12F is (the larger the predicted values calculated by the calculation unit 12F are). Furthermore, for example, the more the attitude or swing of the travel caused by the color of the ground of the travel route A is disordered, the worse the travel state represented by the predicted values calculated by the calculation unit 12F is (the larger the predicted values calculated by the calculation unit 12F are).

It suffices if a method using a machine learning or a method using physical simulation is used to calculate such predictive values.

Figure 5:
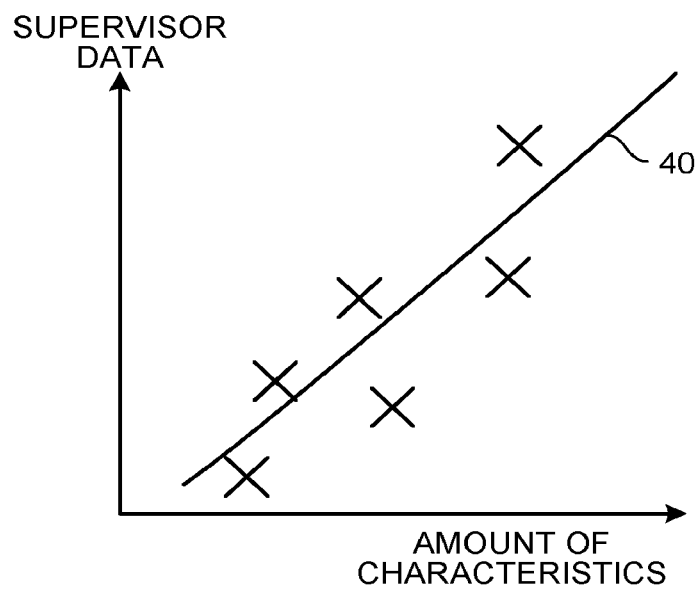
FIG. 5 is a diagram illustrating calculation of a predictive value using machine learning.

First of all, the case where machine learning is used will be described. FIG. 5 is a diagram illustrating calculation of a predictive value using machine learning.

When machine learning is used, a database is prepared in advance in which the amount of three-dimensional characteristics of the ground (geography and information on the surface of the earth) and supervisor data (the attitude information of the roll angle and the pitch angle of the mobile object 11) serve as leaning data. Then an attitude prediction model is created in advance by regression analysis.

Specifically, as shown in FIG. 5, an attitude prediction model 40 representing the relation between the amount of characteristics and supervisor data is generated in advance. The calculation unit 12F then inputs, to the attitude prediction model 40, the amount of three-dimensional characteristics represented by the geographic information on the travel route A within the window W, which is set, on the geographic image obtained from the geographic information acquisition unit 12D. This process allows the calculation unit 12F to obtain the predicted attitude information (supervisor data) on the mobile object 11 from the attitude prediction model 40. It suffices if, the greater the swing of the mobile object 11 in the attitude in the travel route A is compared to that in a standard state without any variation in swing according to the obtained attitude information, the worse the travel state represented by the predictive values calculated by the calculation unit 12F is (the larger the predicted values are, according to the embodiment).

As described above, previously constructing an attitude prediction model from the learning data enables prediction of the attitude information on the mobile object 11 and calculation of predictive values of the travel state.

The attitude prediction model for predicting attitude information has been exemplified; however, the model that is prepared in advance in the method using machine learning is not limited to prediction of attitude information. For example, an angular velocity model may be prepared in advance that uses the irregularity of the geography as the amount of characteristics and that uses, as supervisor data, the amount of change obtained by reading the angular velocity of the mobile object 11 passing there with the gyro sensor. In this case, it suffices if the calculation unit 12F inputs, to the angular velocity model, the degree of unevenness of the geography represented by the geographic information of the set travel route A within the window W on the geographic image obtained from the geographic information acquisition unit 12D. Thorough this process, the calculation unit 12F obtains the predicted amount of change in angular velocity of the mobile object 11 from the angular velocity model. It suffices if, the greater the obtained amount of change in angular velocity, i.e., the attitude of the mobile object 11, in the travel route A is compared to that in a standard state without any variation in angular velocity (swing), the worse the travel state represented by the predictive values calculated by the calculation unit 12F is (the larger the predicted values are).

The case where physical simulation is used will be described. FIG. 6 is a diagram illustrating calculation of predictive values using physical simulation.

In this case, the calculation unit 12F performs 3D modeling based on the geographic information that is the three-dimensional information on the ground (a geographic image may be used). Specifically, the calculation unit 12F represents geographic information Q (see a section (A) of FIG. 6) that is the three-dimensional information on the ground with a mesh t consisting of multiple triangles (see a section (B) of FIG. 6). By performing physical calculations, the calculation unit 12F then obtains the mechanical phenomenon that occurs when the 3D model of the mobile object 11, which is created in advance, passes the determined travel route A1 on the geographic image represented by the geographic information Q.

Accordingly, the calculation unit 12F reproduces the phenomenon assumed to occur actually in a simulative manner. An increase in the modeling accuracy enables accurate simulation of events to occur in the real world. For example, simulating weed not as a rigid object but as a phenomenon that the weed is crushed when stepped on enables reproduction, in advance, representing how much the mobile object 11 sinks when the mobile object 11 passes on the weed (i.e., when the mobile object 11 treads on the weed).

The calculation unit 12F may calculate predictive values of the travel states in which the mobile object 11 travels along the respective multiple travel routes A, which are set, at the current moving speed on the geography represented by the geographic information acquired by the geographic information acquisition unit 12D.

In this case, when machine learning is used, it suffices if a model to be used for machine learning, such as the above-described attitude prediction model or angular velocity model is generated in advance for each moving speed of the mobile object 11. It suffice if, using a model corresponding to the current moving speed of the mobile object, which is acquired by the speed acquisition unit 12, the calculation unit 12F calculate predictive values according to the above-described method using machine learning. When physical simulation is used, it suffices if a mechanical phenomenon that occurs when the mobile object 11 passes along the determined travel route A1 on the geographic image represented by the geographic information Q at the current moving speed of the mobile object 11 acquired by the speed acquisition unit 12 is obtained by physical calculation.

As described above, the calculation unit 12F calculates predictive values with the method using machine learning or the method using physical simulation, which enables prediction of a variety of travel states of the mobile object 11.

As described above, according to the embodiment, the calculation unit 12F calculates predictive values of the travel state for each of the multiple travel routes A that are set by the setting unit 12E.

In other words, according to the embodiment, regarding each of the multiple windows W that are set in the search area F on the travel route A, the calculation unit 12F calculates predictive values of the respective multiple variable factors (the attitude of the travel object 11, the degree of swing of the mobile object 11, sinking of the mobile object 11, etc.) determining the travel state. The case where the calculation unit 12F calculates predictive values of the travel state of the corresponding travel route A will be described here.

FIG. 2 will be referred back here. From weighting values that are determined in advance according to the travel purpose acquired by the travel propose acquisition unit 12A and the predictive values calculated by the calculation unit 12F, the computing unit 12G computes, regarding each of the multiple travel routes A that are set by the setting unit 12E, an evaluation value for the mobile object 11 to realize traveling according to the travel purpose.

The computing unit 12G stores first information that determines weighting values corresponding to the travel purpose in the storage unit 22 in advance. Using the first information, the computing unit 12G computes an evaluation value.

FIG. 7 is a table of an exemplary data structure of first information 50. As shown in FIG. 7, the first information 50 is information that associates travel purposes and weighting values. FIG. 7 exemplifies the first information 50 that associates a travel purpose, the characteristics, and weighting values. The first information 50 may be a database or a table. The form of data of the first information 50 is not limited.

The travel purpose represents, as described above, the purpose of travel. As described above, the travel purpose is, for example, cargo transfer (speed is prioritized), cargo transfer (accuracy is prioritized), chemical application, enclosure management, work assist, survey of a dangerous area, planet search, commercial complex guide, or rescue. The characteristic represents a characteristic during travel that is necessary to achieve the corresponding travel purpose.

For example, when the travel purpose is "cargo transfer (speed is prioritized)", for example, it is necessary to cause the mobile object 11 to travel to move quickly. When the travel purpose is "cargo transfer (accuracy is prioritized)", for example, it is necessary to cause the mobile object 11 to travel such that the cargo mounted on the mobile object 11 is not damaged. When the travel purpose is "chemical application", for example, it is necessary to cause the mobile object 11 to travel such that a chemical can be distributed uniformly. When the travel purpose is "enclosure management", for example, it is necessary to cause the mobile object 11 to travel to travel over the enclosure and capture fine images.

Furthermore, when the travel purpose is "work assist", for example, it is necessary to cause the mobile object 11 follow a person and to cause the mobile object 11 to travel without falling over. When the travel purpose is "survey of a dangerous area", for example, it is necessary to cause the mobile object 11 to travel without falling over in, for example, the ground that collapses easily. When the travel purpose is "planet search", for example, it is necessary to cause the mobile object 11 to travel without falling over such that it goes forward slowly and assuredly. When the travel purpose is "commercial complex guide", for example, it is necessary to cause the mobile object 11 to quickly travel indoors without falling over. When the travel purpose is "rescue", for example, it is necessary to cause the mobile object 11 to travel quickly without falling over.

The characteristics registered in the first information 50 represent characteristics during travel that are necessary to achieve the corresponding travel purposes.

In the first information 50, weighting values according to the corresponding travel purposes are registered in advance.

The weighting values are coefficients that are determined in advance according to the corresponding travel purposes. The more the travel purpose requires traveling while keeping the predetermined normal attitude, the larger the weighting value determined by the first information 50 is. As shown in FIG. 7, the weighting values for the respective variable factors corresponding to each travel purpose are normalized in advance such that the sum of the weighting values of the respective variable factors corresponding to each travel purposes is "10".

According to the embodiment, weighting values are determined for the respective variable factors according to a travel purpose. According to the example shown in FIG. 7, weighting values for the respective variable factors "attitude", "degree of swing" and "sinking" are determined for each travel purpose in the first information 50.

According to the embodiment, weighting values are determined such that the corresponding weighting value increases according to an increase in effect of the variable factor on traveling to achieve the corresponding travel purpose.

According to the example shown in FIG. 7, when the travel purpose is "cargo transfer (speed is prioritized)", weighting values are registered in advance such that the weighting value of the variable factor "attitude" is the largest among the variable factors "attitude", "degree of swing", and "sinking". This represents that the corresponding travel purpose regards keeping the attitude important compared to swing or sinking during travel.

On the other hand, when the travel purpose is "cargo transfer (accuracy is prioritized)", weighting values are registered in advance such that the weighting value of the variable factor "degree of swing" is the largest and the weighting value of the variable factor "attitude" is the smallest among the variable factors "attitude", "degree of swing", and "sinking". This represents that the corresponding travel purpose regards reduction of the degree of swing important compared to the attitude or sinking during the travel.

The weighting values registered in the first information 50 may be registered in advance or may be varied properly by the user by operating the operation unit 20B. Because the weighting values can be varied properly by the user, it is possible to make proper adjustment to register optimum weighting values.

For example, to cause the mobile object 11 mounting a cargo to move, the weighting value of the variable factor "swing" may be changed to be larger. Furthermore, when the mobile object 11 mounts a mechanism enabling automatic recovery even when the mobile object 11 leans, the weighting value of the variable factor "swing" may be changed to be smaller. In this manner, adjusting the weighting value according to the travel purpose of the mobile object 11 and the function of the mobile object 11 enables determination of the optimum travel route A corresponding to the travel purpose of the mobile object 11 and the function of the mobile object 11.

The weighting values represented by the first information 50 may be values corresponding to the type of the mobile object 11. For example, the weighting values registered in the first information 50 shown in FIG. 7 are exemplary values for which it is assumed that the mobile object 11 is a vehicle. On the other hand, if the mobile object 11 is a robot imitating a mode of creature, even when the mobile object 11 travels on a road surface with relatively a lot of unevenness, it is assumed that the swing during the travel is smaller than that of a vehicle. If the mobile object 11 is a robot with an overturn prevention mechanism, regarding also sinking, it is assumed that the swing during travel is smaller than that of a vehicle. For this reason, weighting values according to each travel purpose are preferably registered in advance according to the type of the mobile object 11.

The computing unit 12G computes an evaluation value for each of the multiple travel routes A, which are set, from the weighting values that are determined previously for the respective variable factors according to the travel purpose and the corresponding predictive values. According to the embodiment, the computing unit 12G computes evaluation values for the respective multiple windows W for each travel route A by using the predictive values that are calculated for each of the multiple windows W that are set in the search area F on the travel route A. The computing unit 12G then computes a sum of the evaluation values computed for the respective multiple windows W corresponding to each travel route A as the evaluation value of the corresponding travel route A.

For example, the computing unit 12G computes an evaluation value from the product of the weighting values corresponding to the travel purpose and the predictive values.

Specifically, using an evaluation function represented by the following Equation (1), the computing unit 12G computes an evaluation value for each window W on each travel route A. The evaluation function is determined by a speed coefficient $\sigma$, weighting values, and the predictive values of the travel state. Equation (1) is an exemplary evaluation function in the case where the variable factors that determine the travel state are "attitude", "degree of swing", and "sinking".

$$E=\sigma \times (\alpha \times P + \beta \times R + \gamma \times S) \quad (1)$$

In Equation (1), E denotes an evaluation value for a window W, $\sigma$ denotes a speed coefficient that is determined from the current moving speed of the mobile object 11, $\alpha$ denotes a weighting value of the variable factor "attitude", P denotes a predictive value of the variable factor "attitude" for the window W, $\beta$ denotes a weighting value for the variable factor "degree of swing", R denotes a predictive value of the variable factor "degree of swing" for the window W, $\gamma$ denotes a weighting value of the variable factor "sinking", and S denotes a predictive value of the variable factor "sinking" for the window W.

It suffices if the speed coefficient $\sigma$ is calculated as follows. The computing unit 12G reads the maximum speed of the mobile object 11 from the specification (size, weight, the position of the center of gravity, the maximum speed, the maximum acceleration and deceleration, and the maximum rotational speed) of the mobile object 11 that is contained in the mobile object information acquired by the mobile object information acquisition unit 12. It suffices if the computing unit 12G calculates the speed coefficient $\sigma$ by normalizing the current moving speed of the mobile object 11 between the read maximum speed and the minimum speed "0" and uses the speed coefficient $\sigma$ to calculate the evaluation value for the window W.

As described above, the computing unit 12G computes an evaluation value E for each window W by using the evaluation function represented by Equation (1). The computing unit 12G computes, as the evaluation value of the corresponding travel route A, the sum of the evaluation values computed for the respective multiple windows W corresponding to each travel route A that is set by the setting unit 12E.

In other words, the computing unit 12G computes, for each variable factor, a product of a weighting value that is predetermined for each variable factor according to a travel purpose and computes, as the evaluation value of the corresponding travel route A, the product of the sum of the products computed for the respective factors and the speed coefficient.

Depending on the moving speed of the mobile object 11, the travel state may change; therefore multiplying the sum of the products, each between a predictive value and a weighting value computed for each variable factor, by the speed coefficient of the current moving speed of the mobile object 11 enables computation of an evaluation value in consideration of the moving speed of the mobile object 11.

FIG. 7 exemplifies the first information 50 in the case where there are the three variable factors "degree of swing" and "sinking"; however, the number of variable factors is not limited to three and there may be four or more variable factors or two variable factors.

FIG. 8 is a table of an exemplary data structure of the first information in the case where there are four or more variable factors that determine the travel state. As shown in FIG. 8, first information 52 may determine, for each travel purpose, weighting values of n (n is an integer equal to 4 or more) variable factors "a1", "a2", "a3" to "an", respectively. It suffices if, as in the first information 50 (see FIG. 7), the weighting values of the respective variable factors corresponding to each travel purpose are normalized in advance such that the sum of the weighting values of the respective variable factors corresponding to each travel purpose is "10".

In this case, it suffices if the computing unit 12G computes an evaluation value by using the evaluation function represented by Equation (2).

$$E=\sigma \times (b1 \times F1 + b2 \times F2 + b3 \times F3 \ldots + bn \times Fn) \quad (2)$$

In Equation (2), E denotes an evaluation value for a window W, $\sigma$ denotes a speed coefficient that is determined from the current moving speed of the mobile object 11, b1 to bn denote weighting values of the respective variable factors a1 to an, and F1 to Fn denote predictive values of the respective variable factors a1 to an for the window W.

Also for the case where there are four or more variable factors, it suffices if the computing unit 12G computes an evaluation value for a travel route A in the same manner as that described above.

FIG. 2 will be refereed back here. The determining unit 12H determines, as a travel route A to be followed next, a travel route with the highest evaluation represented by the evaluation value computed by the computing unit 12G among the multiple travel routes A that are set by the setting unit 12E.

As described above, according to the embodiment, the worse the travel state is, the larger the predictive value calculated by the calculation unit 12F is. Furthermore, the better the travel state is, the smaller the predictive value calculated by the calculation unit 12F is. Furthermore, The more the travel purpose requires traveling while keeping the predetermined normal attitude, the larger the weighting value determined by the first information 50 is.

Accordingly, the smaller the evaluation value is, the higher the evaluation determined by the determining unit is. Furthermore, the determining unit determines the travel route A with the highest evaluation (i.e., with the smallest evaluation value) as the travel route A to be followed next. In other words, the determining unit 12H determines, as the travel route A to be followed next, a travel route A along which an ideal traveling according to the travel purpose is most likely to be realized.

The determining unit 12H registers the determined travel route A in the storage unit 22. The determining unit 12H then outputs the determined travel route A to the move control unit 12J and the registration unit 12I.

The registration unit 12I registers the determined travel route A on the geographic image acquired by the geographic information acquisition unit 12D and stores the determined travel route A in the storage unit 22.

The move control unit 12J controls the drive unit 24 to enable traveling along the travel route A that is accepted from the determining unit 12H. Driving performed by the drive unit 24 according to the control of the move control unit 12J enables the mobile mechanism 18 to travel along the accepted travel route A.

The procedure of the information processing executed by the information processing apparatus 12 according to the embodiment will be described here.

Figure 9:
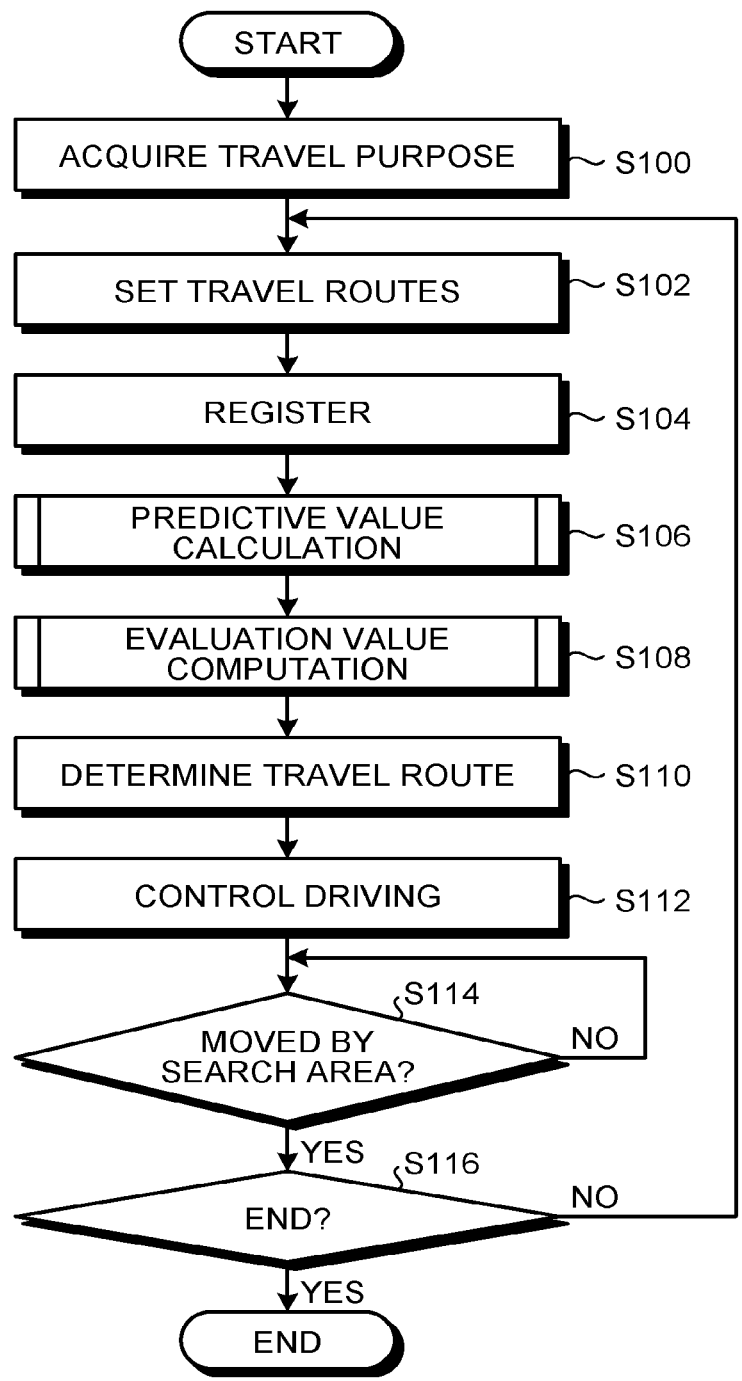
FIG. 9 is a flowchart of an exemplary procedure of information processing.

FIG. 9 is a flowchart of an exemplary procedure of information processing executed by the information processing apparatus 12.

First of all, the travel purpose acquisition unit 12A acquires the travel purpose of the mobile object 11 (step S100). The setting unit 12E then sets multiple travel routes A in different travel directions in a forward area P with respect to the mobile object 11 (step S102). The setting unit 12E registers the set multiple travel routes A on a geographic image acquired by the geographic information acquisition unit 12D (step S104).

The calculation unit 12F then calculates, for each of the multiple travel routes A that are set by the setting unit 12E at step S102, predictive values of the travel state in which the mobile object 11 travels along each of the multiple travel routes A (step S106). The calculation unit 12F calculates, regarding each of the multiple travel routes A that are set at step S102, predictive values for respective variable factors (for example, attitude, degree of swing, sink, etc.) for each window W in the search area F. The details of the predictive value calculation process at step S106 will be described below.

According to the travel purpose acquired at step S100, the computing unit 12G computes, for each of the multiple travel routes A that are set by the setting unit 12E at step S102, an evaluation value for the mobile object 11 to realize traveling according to the travel purpose (step S108). Details of the evaluation value computing process at step S108 will be described below.

The determining unit 12H then determines, as the travel route A to be followed next, a travel route A with the highest evaluation represented by the evaluation value computed by the computing unit 12G at step S108 among the multiple travel routes A that are set by the setting unit 12E at step S102 (step S110).

The move control unit 12J controls the drive unit 24 to enable traveling along the travel route A that is determined at step S110 (step S112). Driving performed by the drive unit 24 according to the control of the move control unit 12J causes the mobile mechanism 18 to travel along the travel route A determined at step S110.

The move control unit 12J repeats the negative determination (NO at step S114) until it is determined that the mobile object 11 has moved by the search area F (YES at step S114). The move control unit 12J makes the determination at step S114 by determining whether the front face (the downstream end of the mobile object 11 in the travel direction) has reached the end of the search area F in the search area F.

Specifically, the storage unit 22 stores in advance the interval between the two parallel sides of an area having the shape of a trapezoid that is determined by the search area F. It suffices if the move control unit 12J makes a positive determination at step S114 upon determining that the mobile object 11 travels by the interval from the current position of the mobile object 11 at which it executes process at steps S102 to S110. It suffices if the determination on whether the mobile object 11 travels by the interval is made by using the mobile object information acquired by the mobile object information acquisition unit 12B.

Upon making the positive determination at step S114 (YES at step S114), the process goes to step S116. At step S116, the information processing apparatus 12 determines whether to end autonomous traveling (step S116). It suffices if the determination at step S116 is made by determining whether the mobile object 11 has reached the goal that is set in advance or whether an instruction for ending traveling is issued by the user by operating the operation unit 20B.

Upon making the negative determination at step S116 (NO at step S116), the process returns to step S102. On the other hand, upon making the positive determination at step S116 (YES at step S116), the routine ends.

The process at steps S102 to S116 is preferably executed after the mobile object 11 starts traveling.

Figure 10:
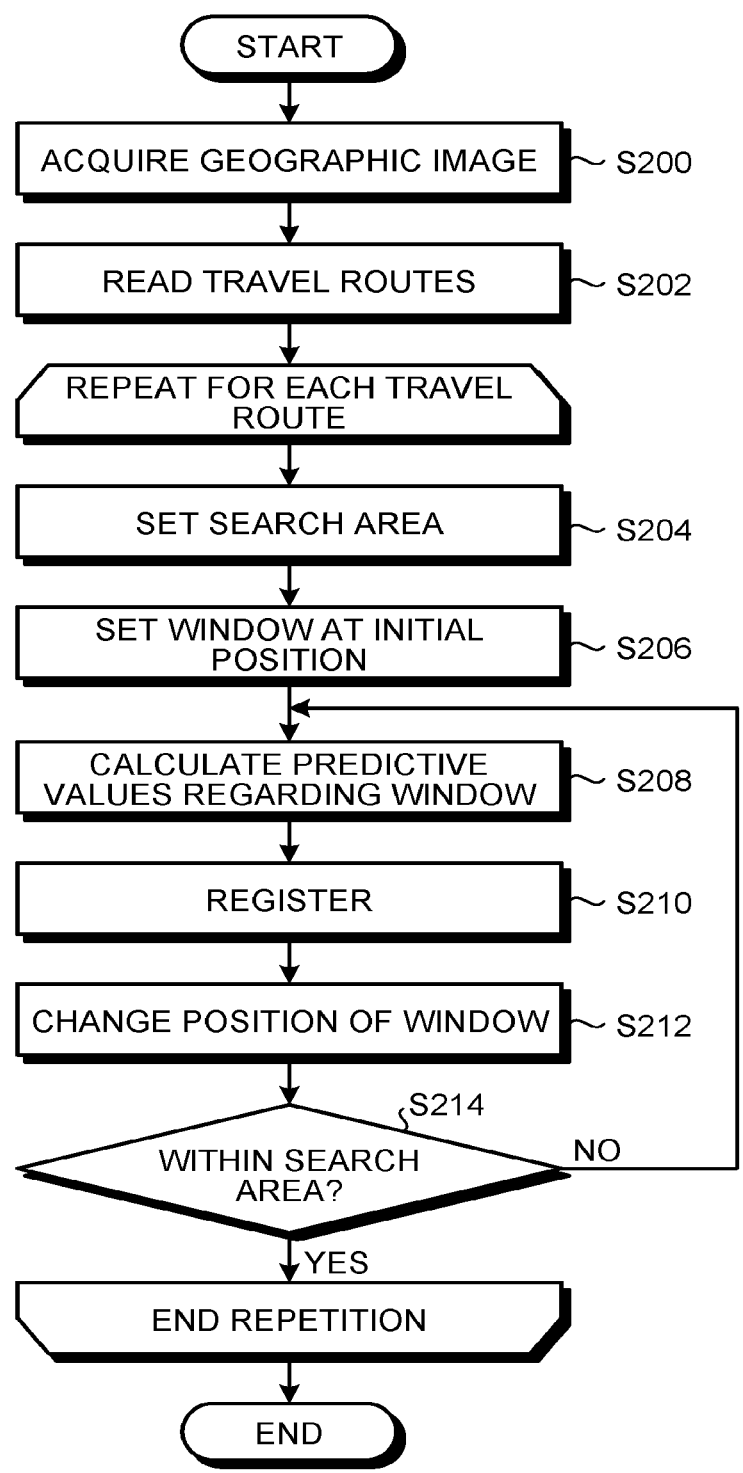
FIG. 10 is a flowchart of an exemplary procedure of predictive value calculation process.

The predictive value calculation process at step S106 in FIG. 9 will be described here. FIG. 10 is a flowchart of the procedure of the predictive value calculation process.

First of all, the calculation unit 12F acquires a geographic image from the geographic information acquisition unit 12D (step S200). The calculation unit 12F then reads the multiple travel routes A that are set by the setting unit 12E at step S102 (see FIG. 9) (step S202).

The calculation unit 12F repeatedly executes the process at step S204 to step S214 for each of the travel routes A that are read at step S202.

First of all, the calculation unit 12F sets a search area F on the travel route A that is arranged on the geographic image acquired by the geographic information acquisition unit 12D (step S204). The calculation unit 12F then sets a window W at the initial position that is the position closest to the mobile object 11 along the travel route A within the search area F on the geographic image (see the window W1 in FIG. 4) (step S206).

The calculation unit 12F then calculates, regarding the set window W, predictive values of the respective multiple variable factors that determine the travel state (step S208). The calculation unit 12F then registers the calculated predictive values of the respective variable factors in association with the identifying information on the travel route A under processing and the identifying information on the window W in the corresponding position on the geographic image or in the storage unit 22 (step S210).

The calculation unit 12F then changes the position of the window W (step S212). At step S212, the calculation unit 12F moves the window W by a predetermined working distance wd in the direction in which the window W is distant from the mobile object 11 long the travel route A that is under processing.

It suffices if the wording distance wd is determined according to the current moving speed of the mobile object 11 and the travel purpose acquired at step S100 (see FIG. 9). For example, it suffices if an adjustment is made such that the higher the current moving speed of the mobile object 11 is, the smaller the working distance wd of the window W is. The adjustment process enables more fine calculation of the predictive value S.

It is determined whether the window W after the moving at step S212 is positioned within the search area F that is set at step S204 (step S214). When the negative determination is made at step S214 (NO at step S214), the process returns to step S208.

When the positive determination is made at step S214 (YES at step S214), the routine ends.

By executing the process at steps S200 to S214, the calculation unit 12F calculates, regarding each of the multiple travel routes A that are set at step S102 (see FIG. 9), predictive values for the respective variable factors (for example, attitude, degree of swing, sinking, etc.) for each window W within the search area F.

Figure 11:
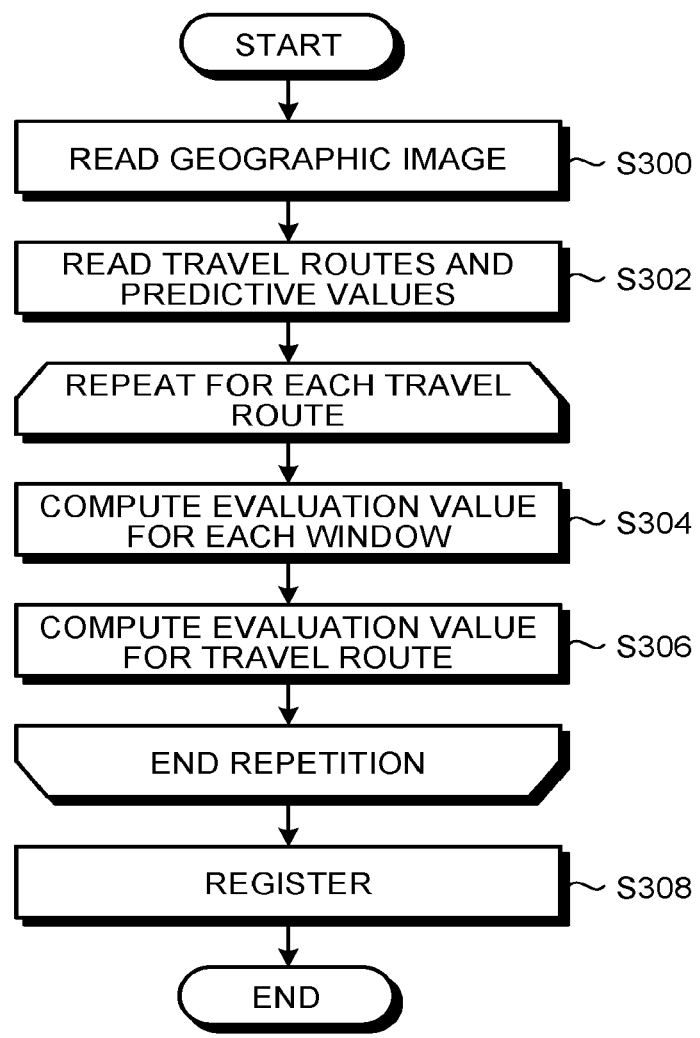
FIG. 11 is a flowchart of an exemplary procedure of an evaluation value computing process.

The evaluation value computing process executed at step S108 in FIG. 9 will be described here. FIG. 11 is a flowchart of an exemplary procedure of the evaluation computing process.

First of all, the computing unit 12G reads the geographic image acquired by the geographic information acquisition unit 12D (step S300). The computing unit 12G reads the multiple travel routes A that are set by the setting unit 12E at step S102 (see FIG. 9) and the predictive values calculated for each travel route A by the calculation unit 12F at step S106 (see FIG. 9) (step S302).

The computing unit 12G repeatedly executes the process at step S304 to S306 for each of the multiple travel routes A that are set by the setting unit 12E at step S102 (see FIG. 9).

Specifically, the computing unit 12G computes an evaluation value for each of the multiple windows W in the search area F that are set on the travel route A from the weighting values that are predetermined for the respective variable factors according to the travel purpose acquired at step S100 and the predictive values calculated for the respective variable factors (step S304).

The computing unit 12G computes, as the evaluation value of the travel route A, the sum of the evaluation values computed for the respective multiple windows W at step S304 (step S306).

After the computing unit 12G performs the process at steps S304 to S306 regarding all the multiple travel routes A that are set at step S102 (see FIG. 9), the process goes to step S308. At step S308, the computing unit 12G registers the computed evaluation values for the respective travel routes A in association with the identifying information on the corresponding travel routes A in the corresponding positions on the geographic image or in the storage unit 22 (step S308).

Because the computing unit 12G executes the evaluation value computing process at steps S300 to S308, evaluation values are computed for the respective multiple travel routes A that are set at step S102 (see FIG. 9).

As described above, the information processing apparatus 12 according to the embodiment includes the travel purpose acquisition unit 12A, the setting unit 12E, the calculation unit 12F, the computing unit 12G, and the determining unit 12H. The travel purpose acquisition unit 12A acquires a travel purpose of the mobile object 11. The setting unit 12E sets multiple travel routes in different travel directions in the forward area P with respect to the mobile object 11. The calculation unit 12F calculates, regarding each of the multiple travel routes A, a predictive value of the travel state in which the mobile object 11 travels along each of the multiple travel routes A. The computing unit 12G computes, regarding each of the multiple travel routes A, an evaluation value for the mobile object 11 to realize traveling according to the travel purpose from weighting values that are predetermined according to the travel purpose and the predictive values. The determining unit 12H determines, as the travel route A to be followed next, the travel route A with the highest evaluation represented by the evaluation value among the multiple travel routes A.

As described above, the information processing apparatus 12 according to the embodiment determines a travel route A allowing autonomous walking, according to the travel purpose. Accordingly, the information processing apparatus 12 according to the embodiment is able to determine a travel route on which autonomous walking can be performed according to the travel purpose.

The computing unit 12G is able to compute an evaluation value from the products each between the weighting value according to the travel purpose and the predictive value.

The travel state is determined by multiple variable factors that vary according to the traveling of the mobile object 11. The calculation unit 12F calculates the predictive values of the respective multiple variable factors as the predictive values of the travel state. The computing unit 12G may compute an evaluation value for each of the multiple travel routes A from the weighting values that are predetermined for the respective variable factors according the travel purpose and their corresponding predictive value.

The weighting value increases according to an increase in effect of the variable factor on traveling for achieving the corresponding travel purpose.

The speed acquisition unit 12C acquires the current moving speed of the mobile object 11. The computing unit 12G preferably computes, for each of the variable factors, the product of the weighting value, which is predetermined for each variable factor according to the travel purpose, and its corresponding predictive value for each of the variable factors and computes, as the evaluation value of the corresponding travel route A, the product of the sum of the products computed for the respective variable factors by the moving speed.

The variable factors include at least any one of the attitude of the mobile object 11, the degree of swing of the mobile object 11, sinking of the mobile object 11, and the color of the ground of the forward area P.

The setting unit 12E preferably sets multiple travel routes A representing routes following the respective multiple travel directions in which the mobile object 11 is mobile.

The geographic information acquisition unit 12D acquires geographic information representing a geography of the forward area P. The calculation unit 12F preferably calculates the predictive values of the travel state in which the mobile object 11 travels along each of the multiple travel routes A at the current moving speed on the geography represented by the geographic information.

It is preferable that, the worse the travel state is, the larger the predicted value calculated by the calculation unit 12F is.

An information processing program according to the embodiment is an information processing program for causing a computer to execute: acquiring a travel purpose of the mobile object 11; setting multiple travel routes A in different travel directions in the forward area P with respect to the mobile object 11; calculating, regarding each of the multiple routes A, a predictive value in the travel state in which the mobile object 11 travels along each of the multiple travel routes A; computing, regarding each of the multiple travel routes A, an evaluation value for the mobile object 11 to realize traveling according to the travel purpose from the weighting values that are predetermined according to the travel purpose and the predictive values; and determining, as the travel route A to be followed next, the travel route A with the highest evaluation represented by the evaluation value among the multiple travel routes A.

The information processing system 10 according to the embodiment includes the information processing apparatus 12, the sensors 14 and 16 that are connected to the information processing apparatus 12, and the drive unit 24 that is connected to the information processing apparatus 12. The information processing apparatus 12 includes the travel purpose acquisition unit 12A, the setting unit 12E, the calculation unit 12F, the computing unit 12G, the determining unit 12H, and the move control unit 12J. The travel purpose acquisition unit 12A acquires a travel purpose of the mobile object 11. The setting unit 12E sets multiple travel routes A in different travel directions in the forward area P with respect to the mobile object 11. The calculation unit 12F calculates, regarding each of the multiple travel routes A, a predictive value in the travel state in which the mobile object 11 travels along each of the multiple travel routes A. The computing unit 12G computes, for each of the multiple travel routes A, an evaluation value for the mobile object 11 to realize traveling according to the travel purpose from weighting values that are predetermined according to the travel purpose and the predictive values. The determining unit 12H determines, as the travel route A to be followed next, the travel route with the highest evaluation represented by the evaluation value among the multiple travel routes A. The move control unit 12J controls the drive unit 24 to enable traveling along the determined route A.

The mode of the embodiment where the information processing system 10 is mounted on the mobile object 11 that autonomously travels has been described as an example; however, the information processing system 10 may be configured as being independent of the main unit of the mobile object 11. The information processing system 10 is applicable to a known unmanned mobile object that is remotely operated (such as a mobile object controlled with a remote controller, specifically, a drone) or a known mobile object driven or operated by a person, such as an automobile.

The hardware configuration of the information processing apparatus 12 according to the embodiment will be described here.

Figure 12:
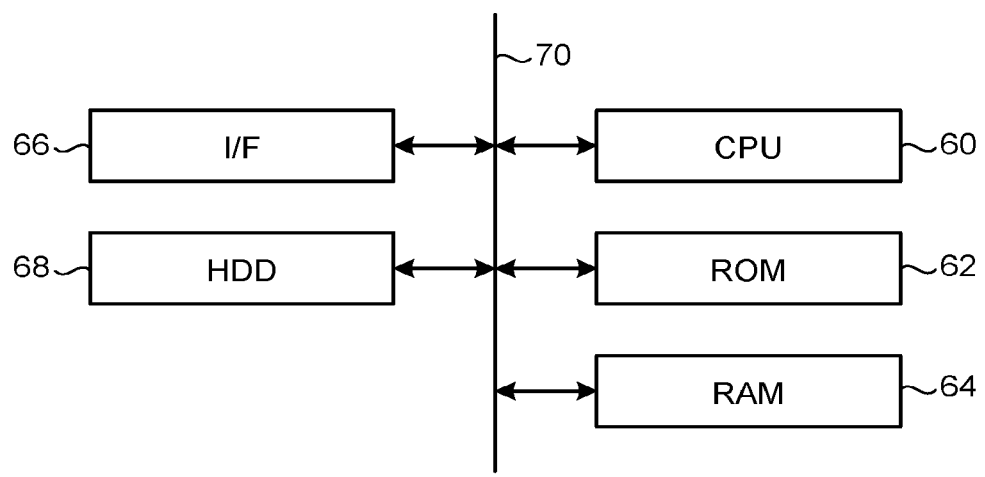
FIG. 12 is a diagram of an exemplary hardware configuration.

FIG. 12 is a diagram of an exemplary hardware configuration of the information processing apparatus 12 according to the embodiment.

The information processing apparatus 12 according to the embodiment includes a CPU 60, a ROM 62, a RAM 64, an interface (I/F) 66, and a hard disk drive (HDD) 68. The CPU 60, the ROM 62, the RAM 64, the I/F 66, and the HDD 68 are connected with one another via a bus 70 and have a hardware configuration using a general-purpose computer. A known display device, an operation unit for accepting various operations from the user and the drive unit 24, the sensor 14, and the sensor 16 are described above (see FIG. 1) are connected to the I/F 66.

The program for executing the above-described various processes that are executed by the information processing apparatus 12 according to the embodiment is provided by incorporating it in, for example, the ROM 62 in advance.

The program for executing the above described various processes that is executed by the information processing apparatus 12 according to the embodiment may be configured to be provided by recording it in a non-transitory computer-readable recording medium, such as a CD-ROM, flexile disk (FD), a CD-R, or a digital versatile disk (DVD), in a file in an installable or executable form. Furthermore, the program for executing the above described various processes that is executed by the information processing apparatus 12 according to the embodiment may be configured to be provided by recording it in a computer that is connected to a network, such as the Internet, for downloading via the network. The program for executing the above-described various processes that is executed by the information processing apparatus 12 according to the embodiment may be configured to be provided or distributed via a network, such as the Internet.

The program for executing the above described various processes that is executed by the information processing apparatus 12 according to the embodiment may be configured as a module including the above-described units. For practical hardware, the CPU reads each program from a storage medium, such as a ROM, and executes the program so that the above-described units are loaded into the main storage device and are generated in the main storage device.

According to the embodiment, an effect is achieved that a travel route in which autonomous walking according to a travel purpose is enabled can be determined.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc. Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    circuitry configured to
        acquire a travel purpose of a mobile object,
        set multiple travel routes in different travel directions in a forward area with respect to the mobile object,
        calculate, regarding each of the multiple travel routes, a predictive value of a travel state in which the mobile object travels along each of the multiple travel routes,
        compute, regarding each of the multiple travel routes, an evaluation value for the mobile object to realize traveling according to the travel purpose from weighting values that are predetermined according to the travel purpose and the predictive values, and
        determine, as a travel route to be followed next, a travel route with a highest evaluation represented by the evaluation value among the multiple travel routes.

2. The information processing apparatus according to claim 1, wherein the circuitry is further configured to compute the evaluation value from products each between the weighting value according to the travel purpose and the predictive value.

3. The information processing apparatus according to claim 1, wherein
    the travel state is determined by multiple variable factors that vary depending on the traveling of the mobile object, and
    the circuitry is further configured to
        calculate predictive values of the respective multiple variable factors as the predictive value of the travel state, and
        compute the evaluation value for each of the multiple travel routes from the weighting values that are predetermined for the respective variable factors according to the travel purpose and their corresponding predictive values.

4. The information processing apparatus according to claim 3, wherein the weighting value increases according to an increase in effect of the variable factor on traveling for achieving the corresponding travel purpose.

5. The information processing apparatus according to claim 3, wherein the circuitry is further configured to
    acquire a current moving speed of the mobile object,
    compute, for each of the variable factors, a product of the weighting value that is predetermined for each of the variable factors according to the travel purpose and its corresponding predictive value, and
    compute, as the evaluation value for the corresponding travel route, a product of a sum of the products computed for the respective variable factors and a speed coefficient of the moving speed.

6. The information processing apparatus according to claim 3, wherein the variable factors include at least any one of attitude of the mobile object, degree of swing of the mobile object, sinking of the mobile object, and color of ground of the forward area.

7. The information processing apparatus according to claim 1, wherein the circuitry is further configured to set the multiple travel routes representing routes following the respective multiple travel directions in which the mobile object is mobile.

8. The information processing apparatus according to claim 1, wherein the circuitry is further configured to
    acquire geographic information representing a geography of the forward area, and
    calculate the predictive values of the travel states in which the mobile object travels along each of the multiple travel routes at a current moving speed on the geography represented by the geographic information.

9. The information processing apparatus according to claim 8, wherein worse the travel state is, larger the calculated predictive value is.

10. A non-transitory computer-readable recording medium that contains an information processing program for causing a computer to execute a method comprising:
    acquiring a travel purpose of a mobile object;
    setting multiple travel routes in different travel directions in a forward area with respect to the mobile object;
    calculating, regarding each of the multiple travel routes, a predictive value of a travel state in which the mobile object travels along each of the multiple travel routes;
    computing, regarding each of the multiple travel routes, an evaluation value for the mobile object to realize traveling according to the travel purpose from weighting values that are predetermined according to the travel purpose and the predictive values; and
    determining, as a travel route to be followed next, a travel route with a highest evaluation represented by the evaluation value among the multiple travel routes.

11. The non-transitory computer-readable recording medium according to claim 10, wherein the computing includes computing the evaluation value from products each between the weighting value according to the travel purpose and the predictive value.

12. The non-transitory computer-readable recording medium according to claim 10, wherein
    the travel state is determined by multiple variable factors that vary depending on the traveling of the mobile object,
    the calculating includes calculating predictive values of the respective multiple variable factors as the predictive value of the travel state, and
    the computing includes computing the evaluation value for each of the multiple travel routes from the weighting values that are predetermined for the respective variable factors according to the travel purpose and their corresponding predictive values.

13. The non-transitory computer-readable recording medium according to claim 12, wherein the weighting value increases according to an increase in effect of the variable factor on traveling for achieving the corresponding travel purpose.

14. The non-transitory computer-readable recording medium according to claim 12, wherein
    the method further comprises acquiring a current moving speed of the mobile object,
    the computing includes computing, for each of the variable factors, a product of the weighting value that is predetermined for each of the variable factors according to the travel purpose and its corresponding predictive value and computing, as the evaluation value for the corresponding travel route, a product of a sum of the products computed for the respective variable factors and a speed coefficient of the moving speed.

15. The non-transitory computer-readable recording medium according to claim 12, wherein the variable factors include at least any one of attitude of the mobile object, degree of swing of the mobile object, sinking of the mobile object, and color of ground of the forward area.

16. The non-transitory computer-readable recording medium according to claim 10, wherein the setting includes setting the multiple travel routes representing routes following the respective multiple travel directions in which the mobile object is mobile.

17. The non-transitory computer-readable recording medium according to claim 10, wherein
the method further comprises acquiring geographic information representing a geography of the forward area,
the calculating includes calculating the predictive values of the travel states in which the mobile object travels along each of the multiple travel routes at a current moving speed on the geography represented by the geographic information.

18. The non-transitory computer-readable recording medium according to claim 17, wherein worse the travel state is, larger the predictive value calculated at the calculating is.

19. An information processing system comprising:
an information processing apparatus;
a sensor connected to the information processing apparatus; and
a drive motor that is connected to the information processing apparatus and drives a mobile mechanism that causes a mobile object to travel, wherein
the information processing apparatus comprises circuitry configured to
acquire a travel purpose of the mobile object,
set multiple travel routes in different travel directions in a forward area with respect to the mobile object,
calculate, regarding each of the multiple travel routes, a predictive value of a travel state in which the mobile object travels along each of the multiple travel routes,
compute, regarding each of the multiple travel routes, an evaluation value for the mobile object to realize traveling according to the travel purpose from weighting values that are predetermined according to the travel purpose and the predictive values,
determine, as a travel route to be followed next, a travel route with a highest evaluation represented by the evaluation value among the multiple travel routes, and
control the drive motor to enable traveling along the determined travel route.

20. The information processing system according to claim 19, wherein the sensor is configured to detect geographic information representing a three-dimensional geography around the information processing apparatus.

* * * * *